(12) United States Patent
Randhawa

(10) Patent No.: US 7,124,705 B2
(45) Date of Patent: Oct. 24, 2006

(54) VISUAL PARKING GUIDE

(76) Inventor: Kuldip Randhawa, 12859 107 Avenue, Surrey, British Columbia (CA) V3T 2E8

( * ) Notice: Subject to any disclaimer, the term of this patent is extended or adjusted under 35 U.S.C. 154(b) by 0 days.

(21) Appl. No.: 10/225,921

(22) Filed: Aug. 23, 2002

(65) Prior Publication Data

US 2003/0037718 A1 Feb. 27, 2003

(51) Int. Cl.
*E04H 6/42* (2006.01)

(52) U.S. Cl. .................... 116/28 R; 33/286

(58) Field of Classification Search ............ 116/28 R; 33/286, 264; D20/10, 19, 41, 42; D10/109, D10/110; 40/584, 594, 607.01, 617
See application file for complete search history.

(56) References Cited

U.S. PATENT DOCUMENTS

| | | | |
|---|---|---|---|
| 2,360,368 A * | 10/1944 | Rubissow ............. 33/264 |
| 2,454,896 A | 11/1948 | Traub |
| 3,072,010 A * | 1/1963 | Brill ................ 356/138 |
| 3,261,321 A * | 7/1966 | Mandl ............ 116/28 R |
| 3,521,234 A * | 7/1970 | Davin ............... 340/435 |
| 3,772,795 A * | 11/1973 | Calvet ............... 33/264 |
| 3,782,322 A | 1/1974 | Wilson |
| 3,817,203 A | 6/1974 | Brauer |
| 3,859,732 A * | 1/1975 | Davin ................ 33/264 |
| 4,036,165 A * | 7/1977 | Wood .............. 116/28 R |
| 4,070,645 A | 1/1978 | Oreluk |
| 4,101,868 A | 7/1978 | Bubnich et al. |
| 4,257,706 A * | 3/1981 | Smith ................. 356/3 |
| 4,318,077 A | 3/1982 | Bubnich et al. |
| 4,341,488 A | 7/1982 | Ryan |
| 4,520,053 A * | 5/1985 | Marentic ............. 428/31 |
| 4,550,986 A * | 11/1985 | Leach ............... 359/883 |
| 4,813,758 A | 3/1989 | Sanders ............. 359/515 |
| 4,873,509 A | 10/1989 | Simi |
| 4,928,393 A * | 5/1990 | Van Schaack ........ 33/264 |
| 4,941,263 A | 7/1990 | Hirshberg ............ 33/264 |
| 4,989,964 A * | 2/1991 | Meise ............... 359/851 |
| 5,004,997 A | 4/1991 | Shisgal et al. |
| 5,189,802 A | 3/1993 | Bergfield |
| 5,222,000 A * | 6/1993 | Adler ............... 359/847 |
| 5,227,785 A | 7/1993 | Gann et al. |
| 5,230,296 A | 7/1993 | Giltz et al. |
| 5,285,205 A * | 2/1994 | White .............. 340/932.2 |
| 5,406,395 A * | 4/1995 | Wilson et al. ......... 359/15 |
| 5,507,245 A | 4/1996 | Kennedy |
| 5,602,542 A | 2/1997 | Widmann |
| 5,738,376 A | 4/1998 | Marom |
| 5,992,343 A | 11/1999 | Drover |

(Continued)

FOREIGN PATENT DOCUMENTS

CH 586338 A * 3/1977

(Continued)

*Primary Examiner*—R. Alexander Smith
(74) *Attorney, Agent, or Firm*—Fasken Martineau DuMouli

(57) ABSTRACT

A visual parking guide, more particularly, a thin flat surface, divided into three zones, with a multitude of markings in each zone, to assist drivers of varying heights to park their car in a safe parking position. The visual parking guide is mountable on a supporting structure such that at least a portion of the parking guide is within the field of view of the driver. By parking the vehicle at a preferred distance from a stationary structure and aligning a fixed point relative to the vehicle with one of the multitude of markings on the visual parking guide, the driver can determine a reference point to use as a means to determine the safe parking position.

16 Claims, 2 Drawing Sheets

U.S. PATENT DOCUMENTS

| | | | |
|---|---|---|---|
| 6,134,793 A * | 10/2000 | Sauers | 33/265 |
| 6,142,640 A * | 11/2000 | Schofield | 359/838 |
| 6,199,287 B1 * | 3/2001 | Rankila | 33/286 |
| 6,211,833 B1 | 4/2001 | Haupt | |
| 6,215,415 B1 | 4/2001 | Schroder | |
| 2001/0039912 A1 * | 11/2001 | Sutton | 116/28 R |

FOREIGN PATENT DOCUMENTS

DE     298 14 571 U1 *   2/1999

\* cited by examiner

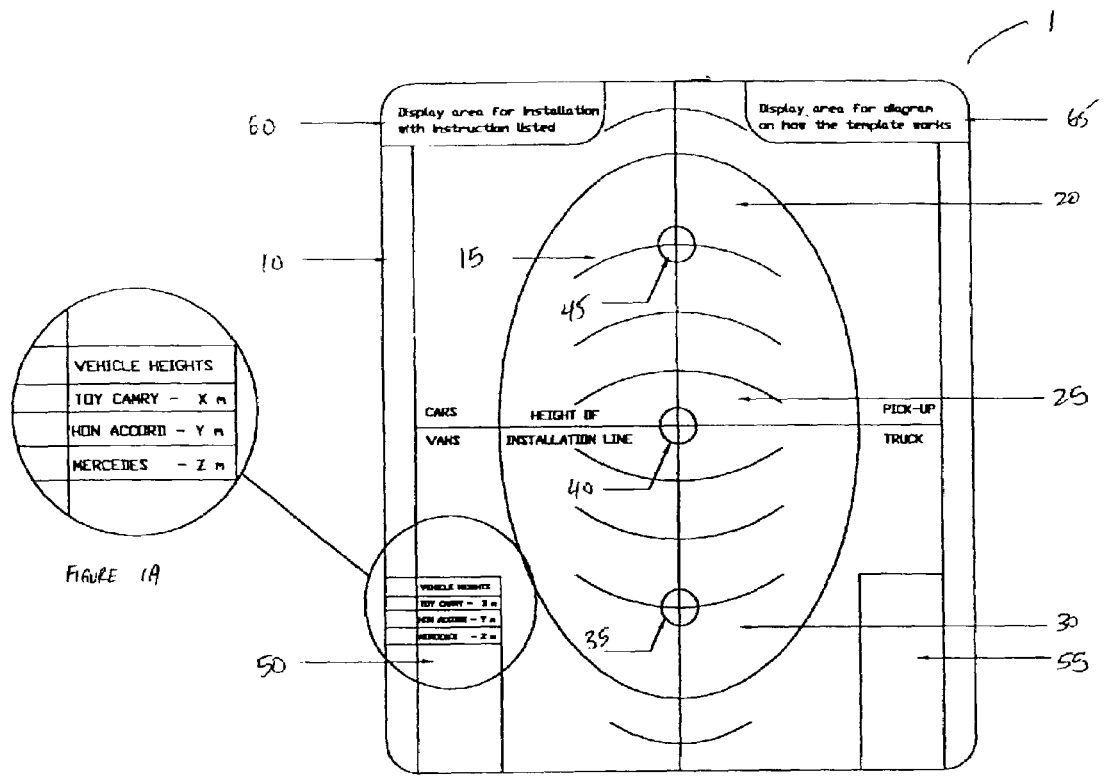
FIGURE 1A
FIGURE 1
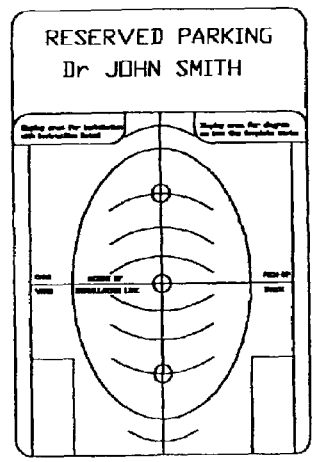
FIGURE 2
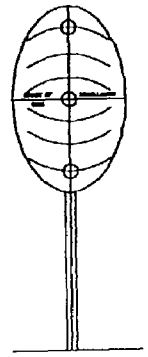
FIGURE 3

VISUAL PARKING GUIDE

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent Office file or records but otherwise reserves all copyright rights whatsoever.

TECHNICAL FIELD

This invention relates to vehicle parking guides, and more particularly, a visual parking guide to assist drivers in parking adjacent to a stationary object without damaging the vehicle.

BACKGROUND

Vehicles are in widespread use and car manufacturers produce a multitude of vehicle models that vary in dimensions. Certain vehicle designs make it difficult for drivers to judge the distance between the front and/or rear end of the vehicle and an object immediately in front of the vehicle. For example, vehicles designed to reduce aerodynamic resistance usually have a steeply sloped hood, making the front end of the car imperceptible to the driver seated in the driver's seat. Furthermore, visibility of the front of the car also depends on the height of the driver, which affects his/her ability to see through the windshield and over the hood of the vehicle.

Parking a vehicle in a parking space bordered by a stationary object, such as a wall, a curb, or a concrete sleeper, requires considerable care in positioning and judging distance to avoid causing damage to the vehicle. For example, drivers can damage the fender of their cars if they misjudge distance and drive into a concrete sleeper. The need to be able to judge the proximity of the vehicle to such stationary object is even greater where space is extremely limited, as is often the case in a residential garage. For example, drivers can damage the garage and the front end of their cars by failing to stop in time before making contact with the wall, or damage can be done to the rear of the vehicle when the garage door closes and the vehicle is not entirely within the garage.

Various visual devices to assist in safely parking a vehicle exist in the prior art. For example, Sanders, U.S. Pat. No. 4,813,758 discloses a vehicle parking guide that uses reflectors and mirrors attached to a plate mounted on a supporting surface to ensure proper longitudinal and lateral positioning of the vehicle in a parking space. Drover, U.S. Pat. No. 5,992,343 discloses a parking assistance device that relies on the alignment of two vertical bars and the alignment of two horizontal bars to recognize the safe position of the vehicle in a sheltered parking space. Ryan, U.S. Pat. No. 4,341,488 discloses a guidepost device which includes an indicator mounted on a rod positioned to indicate a reference point for the driver of the vehicle to recognize the safe position.

The visual parking guides currently available do not provide a flexible reference point to allow drivers of different heights to recognize the safe parking position for the vehicle. The available parking guides are not cost effective. Furthermore, the available parking guides do not minimize space usage because they protrude from the surface they are mounted on or require additional space to be properly positioned.

It is an object of this invention to provide a parking guide with flexible reference points so that it can be used by drivers of varying heights. It is a further object of this invention to provide a parking guide that is cost effective to manufacture and purchase and requires minimal space to use.

SUMMARY OF THE INVENTION

The present invention is a visual parking guide to assist drivers in parking a vehicle in a parking space adjacent to a stationary structure. The visual parking guide is comprised of a flat surface and a multitude of markings on said flat surface. The flat surface is divided into a first zone, a second zone, and a third zone, wherein when the flat surface is mounted to the stationary structure, preferably said first zone is within the field of view of a tall driver, said second zone is within the field of view of an average height driver, and said third zone is within the field of view of a short driver.

A method of setting reference point for parking a vehicle in a parking space adjacent to stationary object is provided, including parking the vehicle at a preferred distance, mounting the visual parking guide such that the visual parking guide is within the field of view of the driver, and aligning a fixed point relative to the vehicle to a particular marking on the visual parking guide to determine the driver's reference point. A method of parking a vehicle in a parking space adjacent to a stationary object is provided, including driving the vehicle in position until the fixed point aligns with the reference point.

BRIEF DESCRIPTION OF FIGURES

Further objects, features and advantages of the present invention will become more readily apparent to those skilled in the art from the following description of the invention when taken in conjunction with the accompanying drawings, in which:

FIG. 1 is a front view of a preferred embodiment of the parking guide;

FIG. 2 is a front view of an alternative embodiment of the parking guide mounted on a sign;

FIG. 3 is a front view of another alternative embodiment of the parking guide mounted on a post;

DETAILED DESCRIPTION OF PREFERRED EMBODIMENTS

As illustrated in FIG. 1, a visual parking guide 1 according to the invention includes a flat surface 10 and a multitude of markings 15 positioned on flat surface 10.

Flat surface 10 is made of a semi-rigid material that has a matte or low lustre finish such as cardboard, plastic, or poster paper. In a preferred embodiment, flat surface 10 is made of an economical grade of poster paper. Flat surface 10 can be any shape or size as long as there is sufficient space on flat surface 10 for markings 15 so that they are clearly visible to the human eye at a distance between the driver's seat of a parked vehicle to the supporting structure where visual parking guide 1 is mounted. As illustrated in FIG. 1, a preferred shape of visual parking guide 1 is generally rectangular and the width is similar to that of typical street signage.

Markings 15 are printed on flat surface 10 using any type of ink or other means known in the art. Preferably, the ink has reflective properties so that markings 15 are clearly visible when illuminated by the headlights of a vehicle. Markings 15 can be any form but are typically generally curved lines disposed horizontally. Markings 15 can be any size so long as they are clearly visible to the human eye at a distance between the driver's seat of a parked vehicle to the supporting structure where visual parking guide 1 is mounted.

Figure 4:
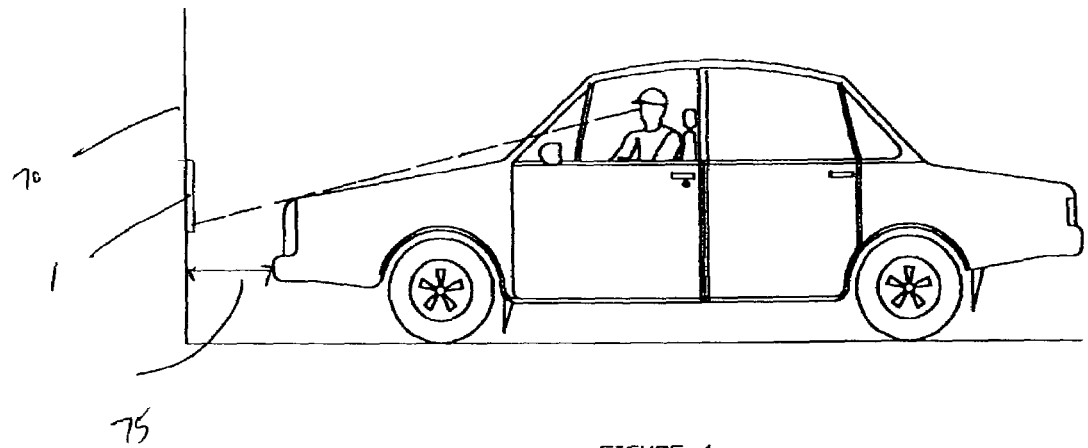
FIG. 4 is a side view of a driver using the parking guide mounted on a wall.
Figure 5:
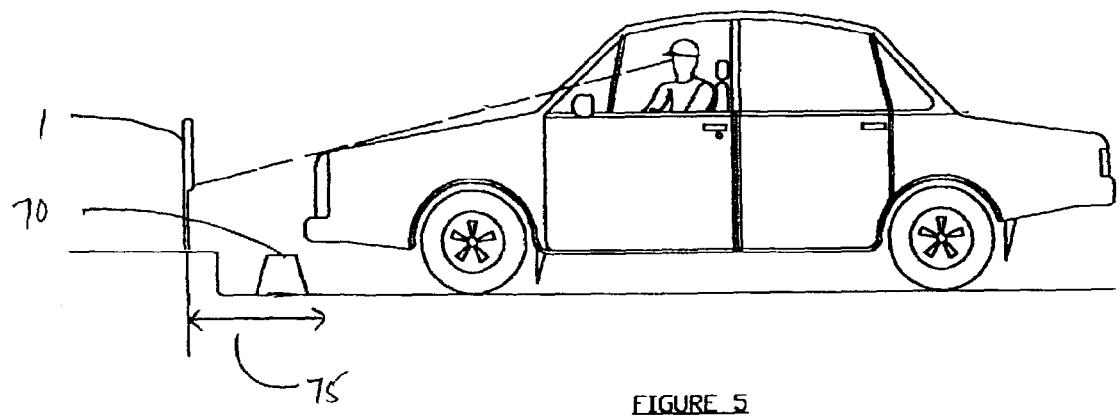
FIG. 5 is a side view of a driver using the parking guide mounted on a post.

As illustrated in FIGS. 2 to 5, visual parking guide 1 is adapted to be mounted on a supporting structure 70, such as a wall, a sign, or a post. In the preferred embodiment, flat surface 10 is mounted on a wall such as the rear wall of a garage or the wall of a parkade, as seen in FIG. 4. In an alternative embodiment, visual parking guide 1 can be adapted to be used with a sign, such as a reserved parking signs such that visual parking guide 1 can be mounted on the area below the reserved parking sign, as best seen in FIG. 2. The reserved parking sign can then be mounted on a wall, a post, or any location where signage is appropriate, as best seen in FIG. 5. In another alternative embodiment, visual parking guide 1 can be mounted on a post without being mounted on a reserved parking sign, as best seen in FIG. 3. Any adhesive means known in the art can be used to mount visual parking guide 1 to supporting structure 70 so long as it is economical and suitable for such mounting.

As illustrated in FIGS. 1 and 1A, a preferred embodiment of visual parking guide 1 includes two tables on flat surface 10 which set out the suggested height to mount visual parking guide 1, having regard to the model and type of vehicle. Because the height of vehicles differ depending on its model and design, a table of suggested heights to mount visual parking guide 1 for cars 50 and a table of suggested heights to mount visual parking guide 1 for vans and trucks 55 are provided on flat surface 10. Preferably, flat surface 10 also includes instructions 60 on how to mount visual parking guide 1 and a diagram 65 displaying proper use of visual parking guide 1. Typically, table for vans and trucks 50, table for cars 55, instructions 60, and diagram 65 are positioned in one of the four corners of flat surface 10.

To use visual parking guide 1, a driver parks his/her vehicle at a preferred distance 75 away from a stationary object, such as a wall, as best seen in FIG. 4. Typically, the vehicle should be at a preferred distance of at least 12 inches away from the wall. Such preferred distance determines the safe parking position of the vehicle that will be used to establish the reference point for use in parking the vehicle in the safe parking position.

In this document, reference point shall mean the particular marking 15 used by a driver to recognize the safe parking position for a vehicle by aligning a fixed point relative to the vehicle, such as the bottom of the rear view mirror or the top of the windshield with the particular marking 15. For example, a tall driver may select the centre of the hood of the parked vehicle as the fixed point to align with tall reference point 35, an average height driver may align the fixed point with average reference point 40, and a short driver may align the fixed point with short reference point 45. The driver can then return the vehicle to the safe parking position by aligning the fixed point with the reference point.

Visual parking guide 1 is mounted on a supporting structure 70 such that tall zone 20, average zone 25, or short zone 30 of visual parking guide 1 is within the field of view of the driver, depending on the height of the driver. Flat surface 10 is divided into three zones: tall zone 20, average zone 25, and short zone 30. Such zones on flat surface 10 allow drivers of various heights to all use visual parking guide 1. For example, because the bottom portion of visual guide 1 is within the field of view of tall drivers when seated in the driver's seat, markings 15 positioned in tall zone 20 of flat surface 10 will assist tall drivers in determining their reference point 35 in relation to the vehicle and visual parking guide 1. Similarly, because short drivers sit lower in the driver's seat, the top portion of visual guide 1 will be within the field of view of short drivers and markings 15 positioned in short zone 30 of flat surface 10 will assist short drivers in determining the reference point. Markings 15 positioned in average zone 25 located at the centre portion of flat surface 10 will assist average height drivers in determining a reference point because the centre portion of visual parking guide 1 is within the field of view of average height drivers when seated in the driver's seat.

Preferably, visual parking guide 1 is mounted in a position such that it is aligned with the centre of the vehicle in the safe parking position. By aligning a fixed point on the vehicle, such as the top of the windshield or the bottom of the rear view mirror, with a particular marking 15 positioned in the appropriate zone, a reference point is set.

After visual parking guide 1 is properly mounted, drivers can then use it as a parking guide by aligning the fixed point with the reference point as they park the vehicle. For example, when moving forward towards supporting structure 70, once the driver has aligned the fixed point with the reference point on visual parking guide 1, the driver stops the vehicle. Visual parking guide 1 can be used by drivers who drive into the parking space and reverse out or by drivers who back into a parking space and drive out. Preferably, visual parking guide 1 is used for driving forward into a parking space.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. A visual parking guide to assist a driver in parking a vehicle comprising:

(a) said visual parking guide being substantially two dimensional and being mountable on a supporting structure; said visual parking guide further comprising:

(b) a flat surface having a low lustre finish;

(c) a multitude of markings positioned on the flat surface wherein said multitude of markings are divided into a tall zone, an average zone and a short zone; said zones being vertically oriented such that the tall zone is positioned below the average zone and the average zone is positioned below the short zone;

(d) said tall, average and short zones being within the field of view of a driver and being adapted to allow the driver when in the driver's seat to position the vehicle at a preferred distance from the supporting structure and said parking guide such that:

(1) said tall zone defines a tall positioning means to allow a tall driver to align a fixed point on the vehicle with said tall zone in order to position the vehicle at said preferred distance, (2) said average zone defines an average positioning means to allow an average height driver to align a fixed point on the vehicle with said average zone in order to position the vehicle at said preferred distance, and (3) said short zone defines a short positioning means to allow a short driver to align a fixed point on the vehicle with said short zone in order to position the vehicle at said preferred distance.

2. The visual parking guide of claim 1, wherein said flat surface is made of a semi-rigid material.

3. The visual parking guide of claim 2, wherein said multitude of markings are generally horizontal curved lines.

4. The visual parking guide of claim 3, wherein said multitude of markings have light reflective properties.

5. The visual parking guide of claim 1, wherein said flat surface is mounted on a wall.

6. The visual parking guide of claim 1, wherein said flat surface is mounted on a sign.

7. The visual parking guide of claim 1, wherein said flat surface is mounted on a post.

8. The visual parking guide of claim 1, wherein a table of suggested heights to mount said flat surface is positioned on a first corner of said flat surface.

9. The visual parking guide of claim 1, wherein instructions to mount said flat surface is positioned on a second corner of said flat surface.

10. The visual parking guide of claim 1, wherein a diagram displaying proper use of said visual parking guide is positioned on a third corner of said flat surface.

11. A method of setting a reference point for parking a vehicle in a parking space adjacent to a stationary structure, comprising the steps of:

(a) parking said vehicle at a preferred distance from said stationary structure and said parking guide;

(b) providing a substantially two dimensional visual parking guide, comprising:

(i) a flat surface adapted to be mounted on a supporting structure, said flat surface having a low lustre finish; and (ii) a multitude of markings positioned on said flat surface;

(c) mounting said visual parking guide on said supporting structure such that said visual parking guide is within the field of view of a driver of said vehicle; and (d) said driver aligning a fixed point on said vehicle visible to said driver with one of said multitude of markings to determine said driver's reference point in relation to said vehicle and said visual parking guide.

12. The method of parking the vehicle in the parking space adjacent to the stationary structure after determining a reference point by the method of claim 11, wherein said driver parks said vehicle at said preferred distance by aligning said fixed point with said reference point.

13. The method of claim 12, wherein said multitude of markings are divided into a first, second and third zone.

14. The method of claim 13, wherein said first zone is within the field of view of a tall driver and said multitude of markings positioned within said first zone determine said tall driver's reference point in relation to said vehicle and said visual parking guide.

15. The method of claim 13, wherein said second zone is within the field of view of an average height driver and said multitude of markings positioned within said second zone determine said average height driver's reference point in relation to said vehicle and said parking guide.

16. The method of claim 13, wherein said third zone is within the field of view of a short driver and said multitude of markings positioned within said third zone determine said short driver's reference point in relation to said vehicle and said visual parking guide.

\* \* \* \* \*